United States Patent [19]

Meiners

[11] Patent Number: 5,072,805
[45] Date of Patent: Dec. 17, 1991

[54] HIGH CLEARANCE VEHICLE FRAME CONSTRUCTION

[76] Inventor: Elmo R. Meiners, Box 126, Anchor, Ill. 61720

[21] Appl. No.: 528,562
[22] Filed: May 24, 1990
[51] Int. Cl.⁵ .......................... B60P 3/06; B60P 3/07; B60P 3/30
[52] U.S. Cl. ................................................. 180/198
[58] Field of Search ...................... 180/198, 53.6, 340; 280/638, 656; 239/172

[56] References Cited

U.S. PATENT DOCUMENTS

| | | | |
|---|---|---|---|
| 1,107,825 | 8/1914 | Morris | 180/198 |
| 1,180,476 | 4/1916 | Cook et al. | 180/198 |
| 1,301,294 | 4/1919 | Morris | 180/198 |
| 1,356,475 | 10/1920 | Schofield | 180/198 |
| 1,396,785 | 11/1921 | Schofield | 180/198 |
| 2,246,882 | 6/1941 | Gentry | 280/79.4 |
| 2,596,473 | 5/1952 | Essick | 239/172 |
| 2,756,831 | 7/1956 | Mitchell | 180/53.6 |
| 3,306,175 | 2/1967 | Ferwerda | 180/198 |
| 3,666,178 | 5/1972 | Crimmins et al. | 239/77 |
| 3,698,734 | 10/1972 | Drake | 280/656 |
| 3,747,788 | 7/1973 | Petetin | 280/656 |
| 3,972,476 | 8/1976 | Hall | 239/167 |
| 4,168,802 | 9/1979 | Hurt | 239/172 |
| 4,822,069 | 4/1989 | Burgess | 280/656 |

FOREIGN PATENT DOCUMENTS

| | | | |
|---|---|---|---|
| 929769 | 7/1955 | Fed. Rep. of Germany | 180/198 |
| 2022038 | 12/1979 | United Kingdom | 180/198 |

*Primary Examiner*—Charles A. Marmor
*Assistant Examiner*—Tamara L. Finlay
*Attorney, Agent, or Firm*—Allegretti & Witcoff, Ltd.

[57] ABSTRACT

A high clearance frame construction for supporting a motor vehicle, and in particular a truck, for use as a tractor-like device for farming and other such related chores. The frame construction includes front and rear tractor-like wheels. The front frame wheels are steered independent of one another through the cooperation of the steering components of the motor vehicle mounted thereon. Likewise, the rear frame wheels are driven by adapting the power take off of the vehicle to independently power each rear wheel. Independent arrangement of the steering and driving components that permits the high clearance feature of the device. The frame construction also features an adjustable frame such that both the overall length and width of the construction may be varied to accommodate different size vehicles. The frame construction is made operational for spraying crops by mounting a spraying tank and boom on the vehicle thereon.

6 Claims, 4 Drawing Sheets

HIGH CLEARANCE VEHICLE FRAME CONSTRUCTION

BACKGROUND OF THE INVENTION

This invention relates to a high clearance frame construction for supporting a truck or other motor vehicle elevated above the surface of a field.

Through the years various frame constructions for supporting motor powered vehicles elevated above ground level have been developed. Morris in U.S. Pat. No. 1,107,825, discloses one such construction. The Morris patent discloses a wheeled platform which supports a tractor vehicle. The platform wheels are driven by a complex gear arrangement powered by the drive force of the rear wheels of the vehicle mounted on the platform.

Cook, in U.S. Pat. No. 1,180,476, teaches a system for steering a wheeled platform which supports a motor vehicle. Other patents disclose variations for driving and steering of a platform which supports a motor vehicle elevated on a platform or frame unit. For example, Morris in U.S. Pat. No. 1,301,294, discloses a single rear steering wheel operatively connected to the front steering wheels of the elevated motor vehicle on the platform. The Morris device is powered through the cooperation of the wheels of the motor vehicle. Ferwerda U.S. Pat. No. 3,306,175 discloses yet another vehicle frame construction powered and steered in cooperation with the components of a motor vehicle mounted thereon.

While such constructions are apparently useful, there has remained a need for an improved high clearance frame construction that is easily steered and can be easily powered by the supported vehicle. Such a construction is deemed especially desirable for agricultural use.

SUMMARY OF THE INVENTION

The high clearance motive frame construction of the present invention is designed to support a motor vehicle, preferably a truck. The frame construction serves, for example, to provide a means by which an ordinary vehicle may be converted to a high clearance farming vehicle for possible use as a crop spraying device.

In a principal aspect, the invention comprises an adjustable frame construction which includes two longitudinal frame beams, a front transverse beam and at least one rear transverse beam. The transverse beams are perpendicular to the longitudinal beams and attached thereto to form a rectangular shaped structure. Each longitudinal and each transverse beam comprises two section parts to effect the adjustable feature of the device. That is, one section is made smaller than the other. The smaller section is slideably disposed or telescoped within the larger section. The length of the each beam is thereby adjusted by sliding one section relative to the other until a desired dimension is achieved. The section parts of each beam are locked together by fasteners. Tractor like frame wheels are attached beneath the frame construction to support the frame construction in an elevated position.

Steering of the frame construction is achieved through the cooperation of the steering mechanism of the elevated and supported motor vehicle and the steering components of the frame construction. The steering components of the frame construction comprise front wheel tire pockets, supported in part by the front transverse beam. Other steering components of the frame construction include a linkage assembly system and a turning rod assembly operatively connected with the front tire pockets. To effect operation of the steering system, a motor vehicle front wheel is inserted into each respective front tire pocket. When vehicle front wheels are turned the resulting turning force is imparted onto the sides of the tire pockets. The force imparted onto each tire pocket is then transferred to the axis supporting the corresponding frame wheel through the cooperation of the linkage assembly system and turning rod assembly. Thus, each front frame wheel is independently supported. However, the front frame wheels are linked via the steering mechanism to each other.

Likewise, the rear frame wheels are also supported by independent or separate axle shafts. Each is also powered by the drive wheels of the motor vehicle. Two alternative methods for converting the drive power of the motor vehicle to each rear wheel axle shaft are contemplated. A first method employs frictional rollers upon which the motor vehicle drive wheels or tires rest. When the motor vehicle wheels rotate, there is a corresponding rotational force imparted onto the frictional rollers of the frame construction. Other components of the frame construction then communicate this rotational motion to the axles to each frame wheel to propel the construction forward.

A second alternative drive assembly comprises a gear box assembly mounted on the rear axle of the motor vehicle. The rotational motion of the axle is directed into the gear box. The gear box then transmits drive force to the axles of each frame wheel. Thus, the driving force of the motor vehicle is adapted to power the frame construction. Again, each frame wheel is driven independently of the other thereby maximizing the effective clearance of the device.

This motive frame construction is adapted for various farming chores by attaching different farming implements to the motor vehicle mounted thereon. Thereby, the frame construction converts an ordinary motor vehicle into a useful tractor-like device for farming.

It is thus an object of the present invention to provide a frame construction for supporting a motor vehicle that is powered and steered through the cooperation of the wheels and drive train of the motor vehicle with that of the frame construction. In addition, the construction provides high clearance between the ground and the frame of the device. The benefit of high ground to vehicle clearance is a particularly desirable attribute for farming equipment as discussed in Hurt U.S. Pat. No. 4,168,802.

Further, it is an object of the invention to provide a simple frame construction with relatively few component parts. Unlike predecessor constructions, the instant construction uses simple component elements to adapt the steering and driving features of the motor vehicle to operate the frame construction.

Another object of the invention is to provide a frame construction which can be readily adapted for use with different size vehicles. The construction of the present invention comprises an adjustable frame. This adjustable frame easily adapts the device to accommodate vehicles of varied front to rear axle dimensions and likewise, different cross widths. Thus, the construction described herein can accommodate different vehicle types for different functions, providing each with the desired high ground clearance.

Further objects, advantages and features of the invention will be made more apparent in the detailed description of the invention to follow.

BRIEF DESCRIPTION OF THE DRAWING

In the detailed description which follows, reference will be made to the drawing comprised of the following figures.

DESCRIPTION OF THE PREFERRED EMBODIMENTS

The high clearance vehicle frame construction of the present invention will be described in reference to FIGS. 1-8, wherein like numbers shall refer to like parts in the various FIGURES.

Figure 1:
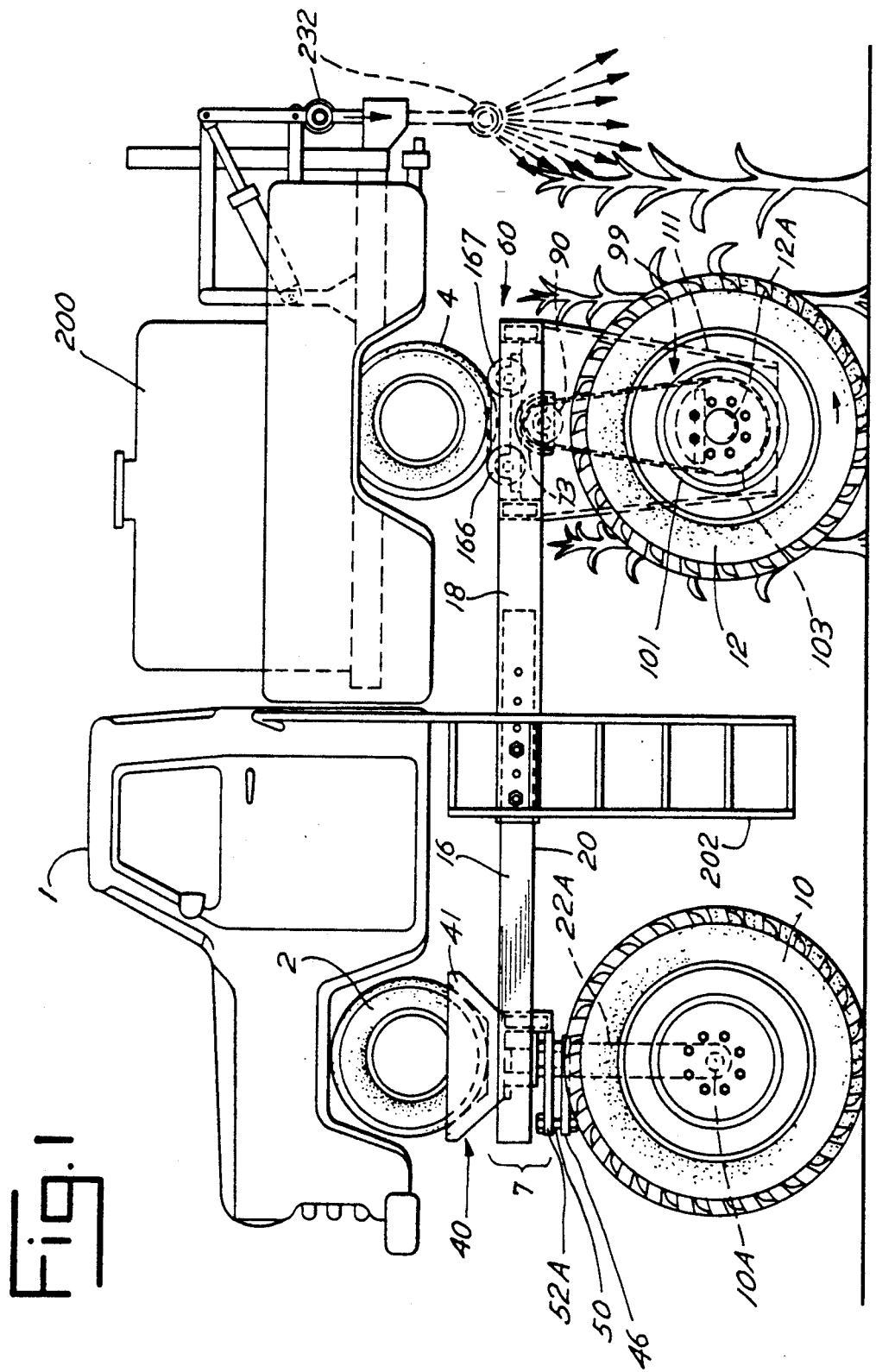
FIG. 1 is a side view of the frame construction shown with a truck and spraying unit mounted thereon.
Figure 2:
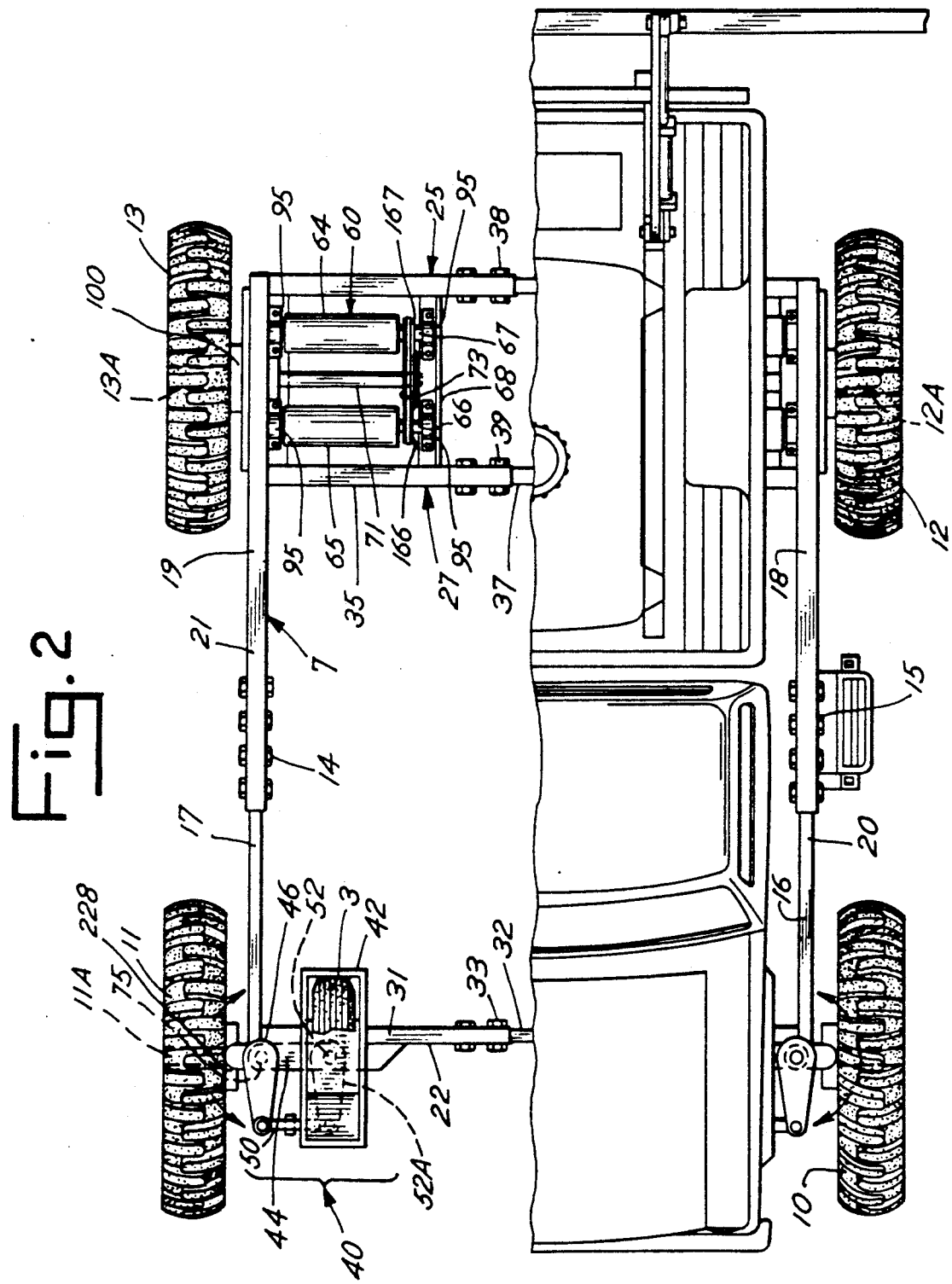
FIG. 2 is a top view of the frame construction with a truck and spraying unit mounted thereon, wherein on the left side, the truck portion has been removed in part to illustrate the component details of the frame construction.
Figure 3:
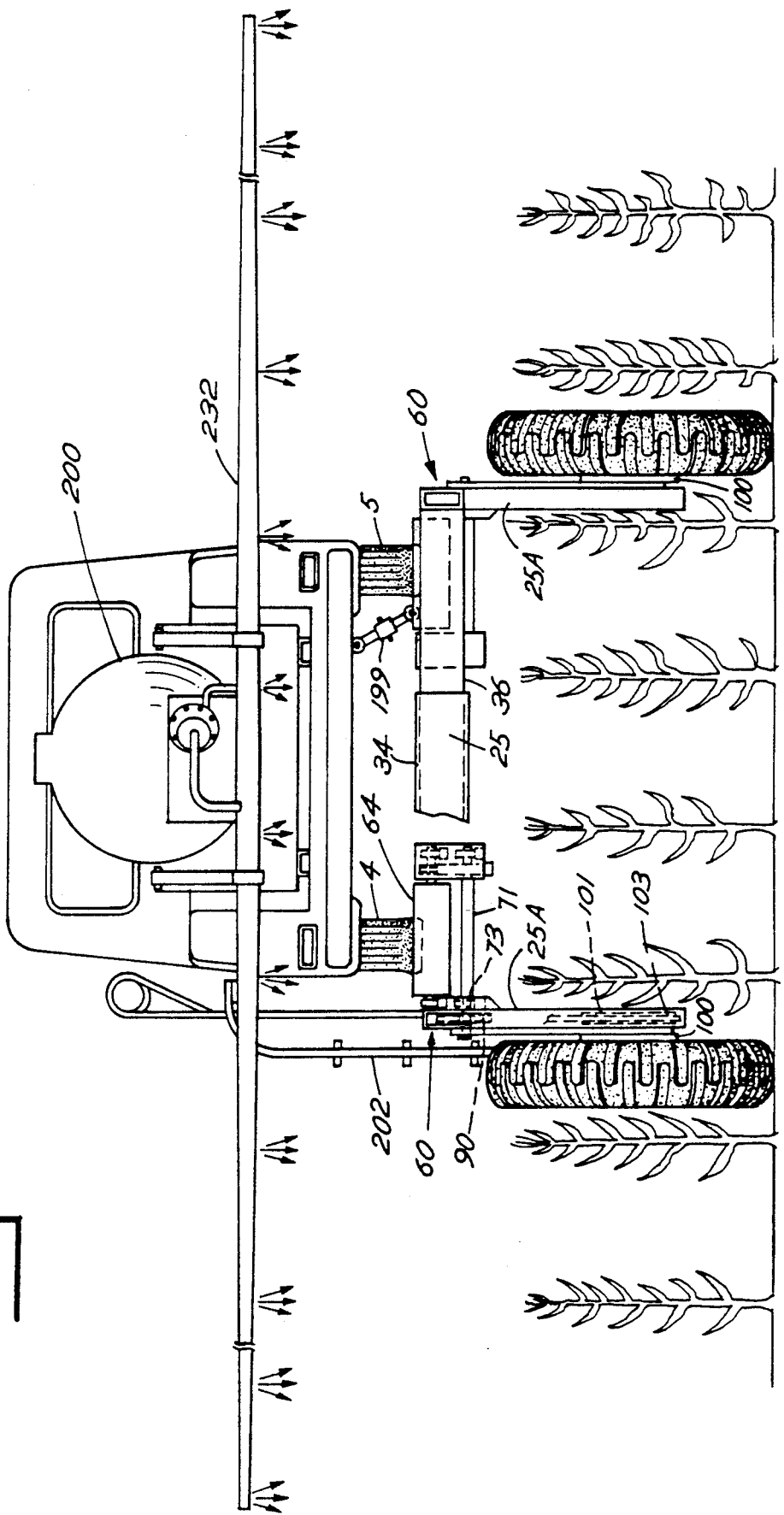
FIG. 3 is a rear view of the frame construction with a truck, spraying unit and nozzle mounted thereon.

Referring to FIGS. 1, 2 and 3, the vehicle frame construction contemplated by the invention is for use in association with a motor vehicle 1 having front steering wheels 2 and 3 and rear driving wheels 4 and 5. The motor vehicle 1 is mounted on top of the frame construction and supported thereby. Essentially, the vehicle frame construction is made operational by adapting the rear driving wheels 4 and 5 of vehicle 1 to power the frame construction. Likewise, the front steering wheels 2 and 3 of vehicle 1 are adapted to steer the frame construction.

The frame construction supporting motor vehicle 1 comprises four main component elements, namely, an adjustable frame 7, frame wheels 10, 11, 12 and 13 each supported on an independent vertical bracket, steering linkage assemblies 40 for each front frame wheel 10 and 11, and drive assembly systems 60 for each rear frame wheel 12 and 13.

Now with reference to FIGS. 1 and 2, the adjustable frame 7 comprises two longitudinal support members 20 and 21 each having a front and rear end. Each longitudinal member 20 and 21 comprises two section pieces 16, 18 and 17, 19, respectively, wherein sections 16 and 17 are made smaller in circumference than sections 18 and 19 and are slideably or telescopically disposed therein. It is telescoping the relationship between sections 16 and 18 and sections 17 and 19 that permits easy lengthwise adjustment of the frame 7. Once the desired relation between the sections 16 and 18, and 17 and 19 is achieved, the sections are secured in place by bolts 14 and 15, respectively. Preferably, sections 16 and 18, and 17 and 19 are locked in place by a series of transverse bolts 14 and 15, which are fed through a plurality of matching bolt holes provided in each section 16, 17, 18 and 19.

A front transverse member or beam 22 is attached to the front ends of each longitudinal member 20 and 21. Transverse member 22 comprises two telescoping sections 31 and 32. Sections 31 and 32 are similar in function and construction to that described for longitudinal sections or beams 16, 17, 18 and 19. Thus, the width adjustment of transverse member 22 is adjustable by sliding the sections 31, 32 relative to each other. Section 31 and 32 are secured together by bolts 33.

The final element comprising the adjustable frame construction structure 7 is the rear transverse support beam 25. In one embodiment, there are two parallel rear support beams or members 25 and 27. In a second embodiment of FIG. 4, only rear support member 25 is used. Support member 25 is perpendicularly attached to the rear end of each longitudinal support member 20 and 21. When used, support member 27 is also attached to longitudinal support members 20 and 21 but at some distance forward of support member 25. The relationship and function of 25 and 27 shall become more apparent once the components of the drive assembly system 60 of the first embodiment are set forth in detail.

Support members 25 and 27 each comprise two telescoping sections or pieces 34, 36 and 35, 37, respectively. Sections 34 and 35 are thus slideably disposed within sections 36 and 37, respectively, to permit the continued adjustment of the width of rear support members 25 and 27. Likewise, sections 34,36 and 35,37 are locked in place by bolts 38 and 39, respectively.

Associated with the front beam 22 are depending brackets 22A and 22B which each cooperate with running gear comprised of wheels 10, 11 mounted on an axles 10A, 11A respectively associated with the brackets 22A, 22B. Brackets 22A, 22B are fixed at the opposite ends of beam 22 and depend downward. They are of equal length and support the frame vertically.

Associated with the rear beams 25, 27 are depending brackets 25A which are fixed to the beams 25, 27 and also support the frame in an elevated position by cooperating with wheels 12,13 journaled in axles 12A, 13A associated with the brackets 25A.

With reference now to FIGS. 2 and 3, the steering linkage system 40 comprises spaced front tire pockets 41 and 42. The tire pockets 41 and 42 are pivotally mounted on pivot stems 51 and 52, respectively, and are supported in part by the front transverse support member or beam 22. Tire pockets 41 and 42 generally cooperate with and support the front vehicle steering wheels 2 and 3 during operation of the device. The width of pockets 41 and 42 closely resembles the width of vehicle wheels 2 and 3, such that, as the vehicle wheels 213 rotate, each exerts a force upon the appropriate tire pocket 41 or 42, causing the pockets 41, 42 to rotate therewith. Thereby, both the steering wheels 2 and 3 and tire pockets 41 and 42 rotate in unison, effectively incorporating the steering function of vehicle 1 onto the frame construction 7.

Preferably, tire pockets 41 and 42 are tapered to more closely correspond to the shape of vehicle wheels 2 and 3 so as to more effectively distribute the resulting steering force onto the tire pockets 41 and 42.

Left and right linkage assembly systems are included to translate the rotational motion of each tire pocket 41 and 42 onto frame wheels 10 and 11, respectively. It is to be understood that both left and right linkage assembly systems operate in the same fashion and therefore, the operation of each shall be described in reference to the right tire pocket 42 and the right frame wheel 11.

In the linkage assembly system of the preferred embodiment, there is a first rotating linkage member or vertical stem 52 pivotally mounted on beam 22 and connected to the tire pocket 42 and a bell crank or lever arm 52A. As tire pocket 42 rotates so too does stem 52 and linkage member 52A associated therewith.

A second linkage arm 46 is linked via link 50 to member 52A at one end and is pivotally connected to a turning rod 75 at its other end. Moreover, turning rod 75 is vertically journaled in a bracket 44 and connects at its lower end to the wheel axle shaft 11A of frame wheel 11. Linkage member 50 is adjustable in length. As tire pocket 42 rotates so too does stem 52 and linkage member 52A. The motion of first linkage member 52A is imparted to the second arm 46. Thus, causing the first and second arms 52A, 46 to pivot or rotate in unison in response to the movement of front tire pocket 42. The rotation of the linkage members 52A and 46 is then transmitted through rod 75 to turn and steer frame wheel 11. Similarly, the motion of tire pocket 41 is transferred to the wheel axle shaft 10A of frame wheel 10 through a linkage assembly system having the same components as that just described for tire pocket 42.

Effectively, this construction allows frame wheels 10 and 11 to be independently steered through the operation of a tire pocket and linkage assembly 40 associated therewith. Thereby, the need for low hanging steering elements is eliminated thus, increasing the effective clearance of the device. That is, any necessary low hanging steering components are located at the periphery of the construction so as to not interfere with the high clearance feature of the construction.

Now, with reference to FIGS. 1,2 and 3, a first embodiment of a rear drive system of the frame construction described. In this embodiment, the construction is powered through the cooperation of the rear vehicle drive wheels 4 and 5 and the left and right drive assembly systems 60 associated with each rear frame wheel 12 and 13. Operatively, the drive assembly system 60 of this embodiment translates the motive force of vehicle wheels 4 and 5 to frame wheels 12 and 13 through the cooperation of a system of interactive gearing elements. The components of drive assembly 60 shall be described with reference to the right-hand vehicle drive wheel 5 and frame wheel 13. It should be understood that both left and right drive assembly systems 60 operate in the same fashion as that described.

Drive assembly system 60 comprises first and second frictional rollers 64 and 65. The rollers are supported by transverse roller shafts 66 and 67, respectively, concentrically aligned therewith. The first free end of each shaft 66 and 67 is journaled in bearings 95 to and supported by longitudinal support member 21. The other end of each shaft 66 and 67 is journaled in bearings 95 on an intermediate longitudinal support beam 68, attached between both rear support members 25 and 27. Also, included on transverse roller shafts 66 and 67 are driven gears 166 and 167, rotatively associated therewith. An intermediate transverse rotating gear shaft 71 supports a gear 73. Intermediate gear shaft 71 rotates in response to the interaction of responsive gear wheel 73 supported thereby, and driven rotating gears 166 and 167. Thus, roller shafts 66 and 67 rotate in response to the rotation of rear vehicle wheel 5. In turn, gear shaft 71 is set in motion through the interaction of gears 166 and 167 and responsive gear 73 mounted thereon. Preferably, the differential gear ratio between gears 166 and 167 and responsive gear 73 is approximately 1 to 3.

Further, an outer gear wheel 90 is also mounted on rotating gear shaft 71. Drive assembly 60 also comprises drive train assembly 99, which includes drive belt 101. Drive belt 101 encircles both gear 90 and another gear 103 mounted on wheel axle shaft 100 journaled in bracket 25A. So as, shaft 71 rotates outer gear wheel 90 initiates the rotation of drive belt 101. The rotation of drive belt 101 thus effects the rotation of associated gear 103 mounted on wheel shaft 100. Finally, it is the rotation of wheel axle shaft 100 that initiates the forward motion of frame wheel 13.

Again, each rear wheel 12 and 13 is independently operated in response to the rotation of the associated left and right rollers 64 and 65. This construction eliminates the need for a low riding connecting axle between frame wheels 12 and 13, thereby providing the high clearance feature of the device.

Alternatively, another embodiment of the drive assembly is contemplated for the frame construction of the invention and is described with reference to FIG. 4. This embodiment comprises left and right gear box assemblies 150. Any gear box assembly 150 may be used, the construction of which is generally known to those skilled in the mechanical arts. The gear box 150 is adapted for operation with rear tire axle 8 of motor vehicle 1 by removing rear vehicle wheels 4 and 5 and substituting supports 55 therefor. Rotational force is transmitted from each gear box 150 to frame wheels 12 and 13 through the operation of left and right drive trains 102.

Figure 4:
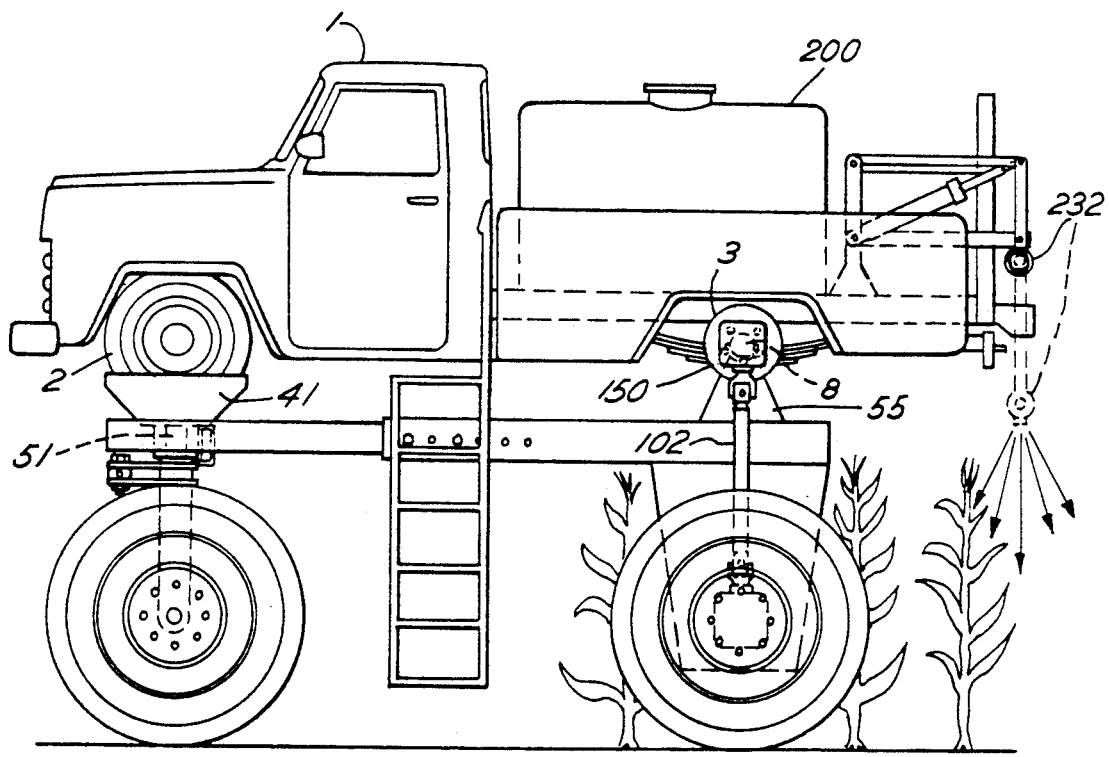
FIG. 4 is a side view of an alternate embodiment of the frame construction with a truck, spraying unit and nozzle mounted thereon.

Referring to FIGS. 1 and 4, in the construction of the preferred embodiment there is an anchor means 199. The anchor means 199 is attaches vehicle 1 to frame construction 7 for the purpose of maintaining each in a secured relation to one another. There is also included in the preferred embodiment a ladder 202 secured to longitudinal support member 20, for providing easy access to the cab of vehicle 1.

It is contemplated that the high clearance frame construction described be adapted for use in association with certain farming chores. In particular, it is contemplated that the construction be used in association with a spraying unit 200 comprising a transverse adjustable spray boom 232 whereby the adjustable spray boom shall accommodate for variations in crop height as necessary.

While there has been set forth a preferred construction of the invention, it should be understood that the description is not intended to limit the scope of the invention and that the invention is only to be limited by the spirit and scope of the following claims and their equivalents.

What is claimed:

1. A high clearance frame construction for supporting a vehicle in an elevated position, said vehicle of the type having front steering wheels and rear driving wheels with a drive train to said rear driving wheels from the engine of the vehicle, said construction in an elevated position comprising, in combination:
   a) at least one longitudinal frame member;
   b) at least two generally parallel spaced transverse frame members attached to the longitudinal frame member, said longitudinal frame member including means for adjusting the spacing of the transverse members from one another;
   c) running gear attached to each end of the transverse frame members, said running gear including a vertical support bracket depending from the transverse frame member and wheel means attached to each vertical support racket whereby the transverse frame members and longitudinal frame member are elevated for support of a vehicle in an elevated position on the assembled frame members;

one of said transverse members defining a forward transverse member, said forward transverse member including a means for engaging the front steering wheels of a vehicle supported on the frame construction and also including steering gear means connecting the means for engaging with the wheel means of the forward transverse member whereby the wheel means of the forward transverse member may be steered in response to steering movement of the front steering wheels of the vehicle;

another of said transverse members defining a rear transverse member, said rear transverse member including means for driving the rear wheel means and for cooperation with driving means of a vehicle on the frame construction; and the forward transverse member and the rear transverse member each comprising two telescoping sections slideably disposed with respect to each other to permit adjustment of the overall width of the frame construction, said frame construction also comprising a means for securing said telescoping sections in a fixed position for operation.

2. The frame construction of claim 1 including first and second generally parallel longitudinal frame members, each member comprising two telescoping sections slideably disposed with respect to each other to permit adjustment of the overall length of the longitudinal frame members, said frame construction also comprising a means for securing said sections in a fixed position for operation.

3. The frame construction of claim 1 wherein the means for engaging the front steering wheels of a vehicle supported on the frame construction comprise pocket members pivotally mounted on the forward transverse member, each pocket member adapted to receive and coact with a vehicle front steering wheel;

and wherein the steering gear means comprise a vertical drive rod pivotally mounted in each vertical support bracket depending from a forward transverse member and connected at its lower end to an axle of wheel means and operatively connected to the pivotal pocket member at its upper end;

whereby pivoting of the pocket member about a vertical axis simultaneously pivots the rod and wheel means thereby steering the frame construction.

4. The frame construction of claim 3 wherein the front pocket members are tapered to correspond to the shape of a motor vehicle wheel to improve contact between the tire pocket members and the motor vehicle front steering wheels resting therein.

5. The frame construction of claim 1 wherein driving means comprises:
a) a frictional wheel assembly rotatively associated with each rear driving wheel said frictional wheel assembly being supported in part by the rear transverse member; and
b) a drive belt assembly drivingly connecting the frictional wheel assembly with the wheel means supported on each vertical support bracket whereby the rotation of each frictional wheel assembly is transferred to the wheel means.

6. The frame construction of claim 1 wherein said driving means comprises:
a) at least one power take off from the drive train of the motor vehicle;
b) a drive assembly connecting the power take off with the wheel means.

* * * * *